United States Patent
Hongo et al.

(10) Patent No.: US 7,405,930 B2
(45) Date of Patent: Jul. 29, 2008

(54) ELECTRONIC APPARATUS

(75) Inventors: Takeshi Hongo, Sagamihara (JP); Hiroshi Nakamura, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 448 days.

(21) Appl. No.: 11/168,368

(22) Filed: Jun. 29, 2005

(65) Prior Publication Data

US 2006/0002081 A1     Jan. 5, 2006

(30) Foreign Application Priority Data

Jun. 30, 2004 (JP) ............................. 2004-193770

(51) Int. Cl.
*H05K 7/20* (2006.01)
*H01L 23/36* (2006.01)

(52) U.S. Cl. .................. 361/687; 361/695; 361/696; 361/714; 165/104.29; 165/104.33; 165/185

(58) Field of Classification Search .............. 361/687, 361/690, 692–695, 697, 702–709, 732, 714; 361/717–722; 165/104.29, 104.33, 104.21–104.26, 165/185, 104.32; 454/184; 62/259.2; 312/223.1, 312/223.2, 223.3; 257/715–727

See application file for complete search history.

(56) References Cited

U.S. PATENT DOCUMENTS

| | | | |
|---|---|---|---|
| 4,365,666 A | * | 12/1982 | Seifert ................... 165/104.29 |
| 4,949,218 A | * | 8/1990 | Blanchard et al. ........... 361/696 |
| 5,823,248 A | * | 10/1998 | Kadota et al. .......... 165/104.33 |
| 6,158,985 A | * | 12/2000 | Watanabe et al. ....... 417/423.14 |
| 6,430,042 B1 | * | 8/2002 | Ohashi et al. ............... 361/687 |
| 6,789,611 B1 | * | 9/2004 | Li ......................... 165/104.29 |
| 6,889,752 B2 | * | 5/2005 | Stoller .......................... 165/47 |
| 2005/0276018 A1 | * | 12/2005 | Moore et al. ................ 361/695 |

FOREIGN PATENT DOCUMENTS

| JP | 02205397 A | * | 8/1990 |
|---|---|---|---|
| JP | 10-051170 | | 2/1998 |
| JP | 10122773 A | * | 5/1998 |

* cited by examiner

*Primary Examiner*—Michael V Datskovskiy
(74) *Attorney, Agent, or Firm*—Pillsbury Winthrop Shaw Pittman LLP

(57) ABSTRACT

An electronic apparatus has a housing which is formed with a suction port and an exhaust port. The interior of the housing is partitioned with a first chamber and a second chamber by a partition wall. The first chamber accommodates a CPU generating heat. The suction port and the exhaust port are open to the second chamber. A heat pipe which transfers a heat of the CPU from the first chamber to the second chamber is disposed pass through the partition wall. A fan is disposed in the second chamber. The fan suctions air from the suction ports and discharges the suctioned air from the exhaust port. The heat of the CPU transferred to the second chamber is emitted out of the housing. A part where the heat pipe pass through the partition wall is liquid-tightly sealed through a sealing member.

8 Claims, 10 Drawing Sheets

ELECTRONIC APPARATUS

CROSS-REFERENCE TO RELATED APPLICATIONS

This application is based upon and claims the benefit of priority from the prior Japanese Patent Application No. 2004-193770, filed on Jun. 30, 2004; the entire content of which is incorporated herein by reference.

BACKGROUND

1. Field

Embodiments of the the invention relate to an electronic apparatus in which a circuit component generating heat, for example, a CPU is mounted, and more particularly to a structure for enhancing waterproofness with the heat radiation performance of a circuit component maintained.

2. Description of the Related Art

A CPU for use in an electronic apparatus such as portable computer has increased in the quantity of heat generation during operation with the heightened processing speed and multifunctionalization thereof. When the temperature of the CPU becomes excessively high, there occurs the problem that the efficient operation of the CPU is lost, or that the CPU falls into an inoperable state.

As a measure against heat, a related-art electronic apparatus includes a cooling unit which forcibly cools the CPU. The cooling unit is accommodated in the housing of the electronic apparatus together with the principal constituents thereof, for example, a printed circuit board and a hard disk drive.

The cooling unit includes a heat radiation plate which is thermally connected to the CPU, a heat conduction duct which is attached to the heat radiation plate, a fan which is accommodated in the heat conduction duct, and a heat pipe by which the heat of the CPU conducted to the heat radiation plate is transferred to the vicinity of the heat conduction duct.

The heat conduction duct has suction ports and an exhaust port. The suction ports and the exhaust port are open to the exterior of the housing. When the fan operates, cool air outside the housing is imbibed from the suction ports into the heat conduction duct, and the imbibed air is emitted out of the housing through the exhaust port. As a result, the heat conduction duct is forcibly cooled, and the heat of the CPU conducted to the heat conduction duct through the heat radiation plate as well as the heat pipe is radiated out of the housing afloat in the currents of the air (refer to, for example, JP-A-10-51170).

BREIF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION

Now, an embodiment of the present invention will be described in conjunction with the drawings in which the invention is applied to a portable computer.

Figure 1:
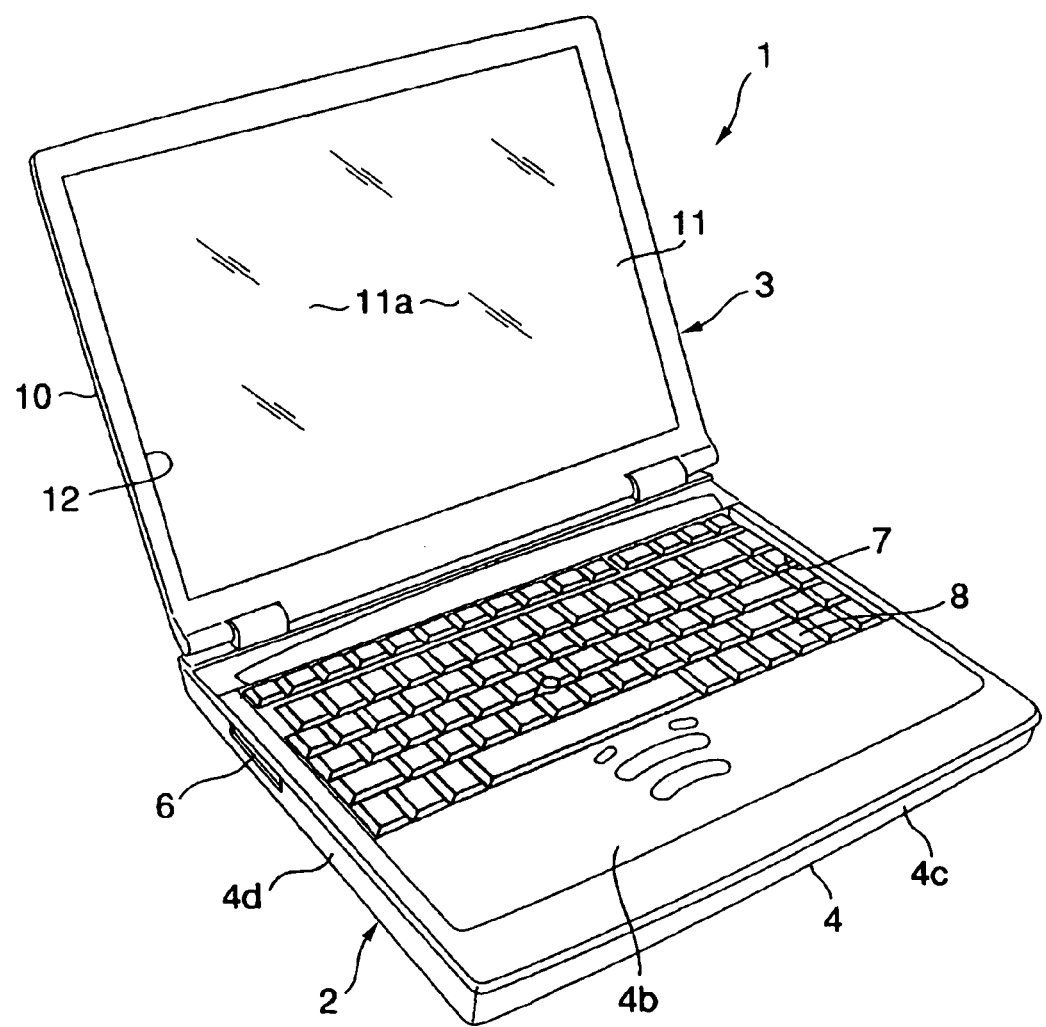
FIG. 1 is a perspective view of a portable computer according to an embodiment of the present invention.
Figure 2:
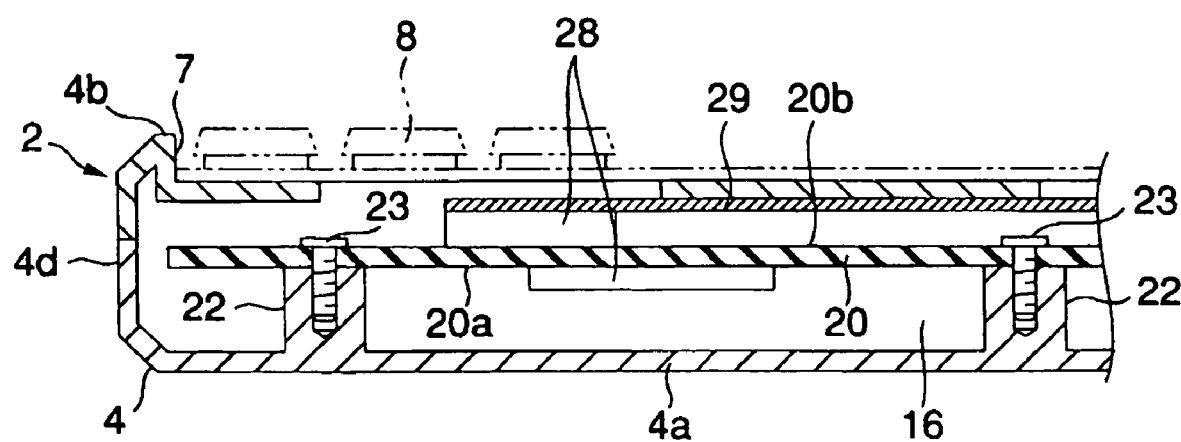
FIG. 2 is a sectional view of the portable computer according to the embodiment of the invention showing a state where a printed circuit board is fixed to a first housing.
Figure 3:
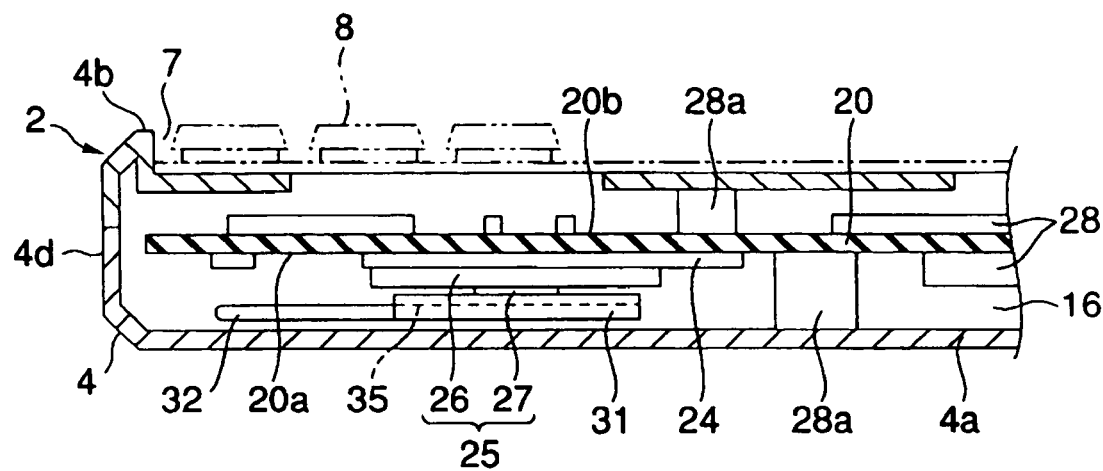
FIG. 3 is a sectional view of the portable computer according to the embodiment of the invention showing the positional relationship between a CPU and a heat reception plate which are mounted on the first housing.

FIGS. 1 through 3 discloses the portable computer 1 which is an example of an electronic apparatus. The portable computer 1 includes a body unit 2 and a display unit 3. The body unit 2 has a first housing 4. The first housing 4 is made of a metal material which is light in weight and high in thermal conductivity, for example, an aluminum alloy or a magnesium alloy.

Figure 4:
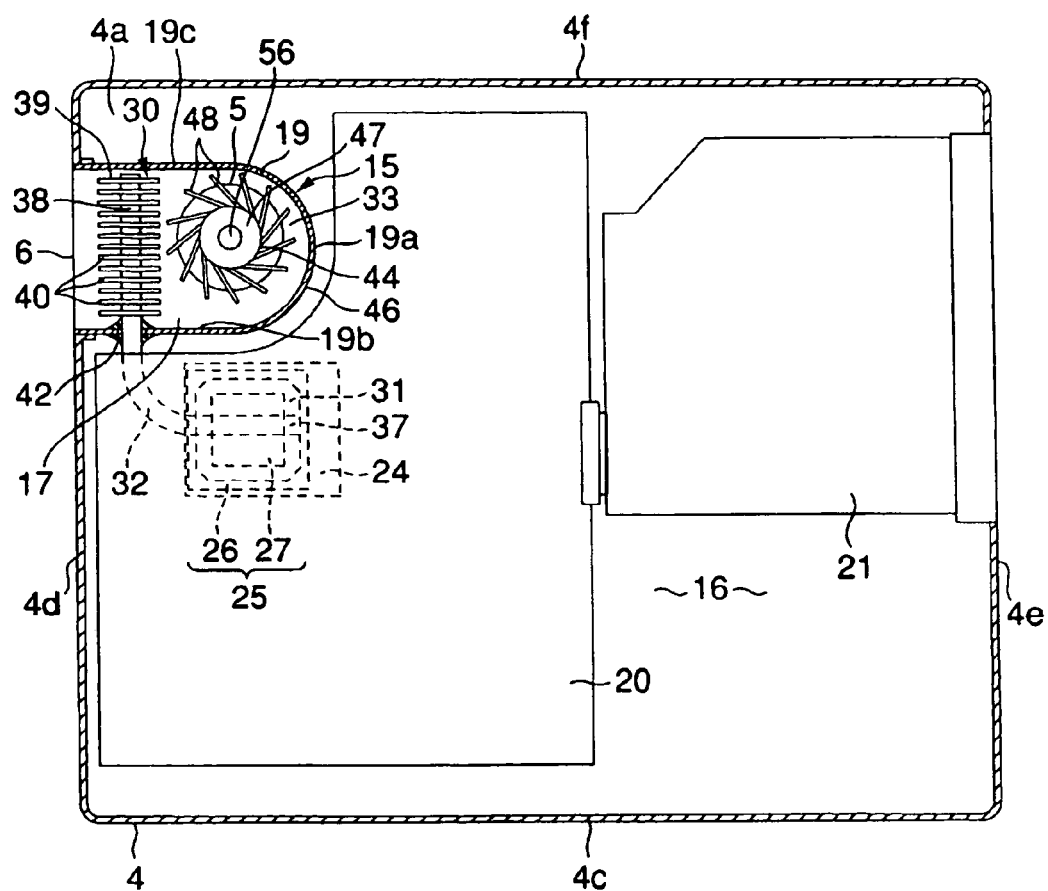
FIG. 4 is a sectional view of the portable computer according to the embodiment of the invention showing the positional relationship between a first chamber accommodating the printed circuit board therein and a second chamber accommodating a fan therein.

The first housing 4 is in the shape of a flat box which has a bottom wall 4a, a top wall 4b, a front wall 4c, left and right sidewalls 4d and 4e, and a rear wall 4f. As shown in FIG. 4, the first housing 4 has suction ports 5 and an exhaust port 6. The suction ports 5 are located at the left end part of the rear end of the bottom wall 4a, while the exhaust port 6 is located at the-rear end part of the left sidewall 4d.

A keyboard support portion 7 is formed in the top wall 4b of the first housing 4. The keyboard support portion 7 is a recess which sinks inside the first housing 4, and which overlies the suction ports 5. This keyboard support portion 7 supports a keyboard 8.

As shown in FIG. 1, the display unit 3 includes a second housing 10 and a liquid-crystal display panel 11. The liquid-crystal display panel 11 is accommodated in the second housing 10. This liquid-crystal display panel 11 has a screen 11a which displays an image. The screen 11a is exposed out of the second housing 10 through an opening 12 which is formed in the front surface of this second housing 10.

The second housing 10 is connected to the rear end part of the first housing 4 through hinges not shown. Owing to the connection, the display unit 3 is turnable between a shut position where it overlies the body unit 2 so as to cover the keyboard 8 from above, and an open position where it rises relative to the body unit 2 so as to expose the keyboard 8 and the screen 11a.

Figure 6:
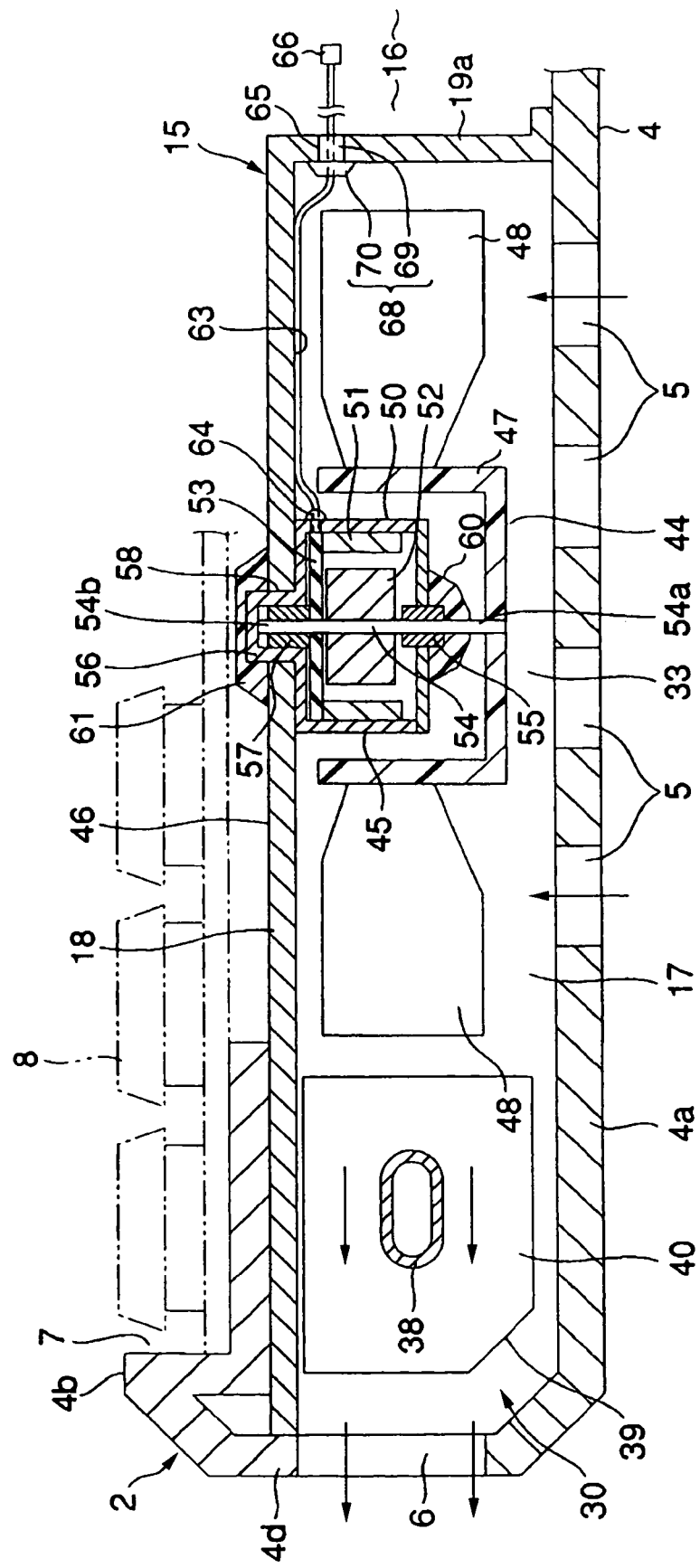
FIG. 6 is a sectional view showing the positional relationship among the fan, a heat sink and the heat radiation end of the heat pipe, in the embodiment of the invention.

As shown in FIGS. 4 and 6, the interior of the first housing 4 is liquid-tightly divided into a first chamber 16 and a second chamber 17 through a partition wall 15. The partition wall 15 is made of a metal material which is similar to that of the first housing 4. This partition wall 15 has a ceiling plate portion 18 which confronts the bottom wall 4a, and a peripheral wall portion 19 which extends downwards from the peripheral edge of the ceiling plate portion 18.

The ceiling plate portion 18 faces the exhaust port 6 with one end thereof abutting on the left sidewall 4d, and it confronts the suction ports 5 at the other end thereof. The peripheral wall portion 19 has first through third portions 19a-19c. The first portion 19a surrounds the suction ports 5 over a semicircle, and confronts the exhaust port 6. The second portion 19b and the third portion 19c extend from the first portion 19a toward the exhaust port 6, respectively, and they are arranged in parallel with an interval therebetween. The second and third portions 19b and 19c face the exhaust port 6 in a state where their end parts remote from the first portion 19a abut on the left sidewall 4d, respectively.

The lower edges of the first through third portions 19a-19c are liquid-tightly fixed to the bottom wall 4a of the first housing 4 by fixation means, for example, brazing or welding. Owing to the fixation, the partition wall 15 and the first housing 4 are held in a state where they are thermally connected. The first chamber 16 is a hermetically-sealed space which assumes the greater part of the interior of the first housing 4, and whose communication with the exterior of the first housing 4 is cut off. The second chamber 17 lies aside near the left end part of the first housing 4, and the suction ports 5 and the exhaust port 6 are open to this second chamber 17.

As shown in FIGS. 2 through 4, the first chamber 16 of the first housing 4 accommodates a printed circuit board 20 and an optical disk drive 21 therein. The printed circuit board 20 and the optical disk drive 21 are the principal constituents of the portable computer 1, and they are arrayed to each other in the widthwise direction of the first housing 4.

The printed circuit board 20 is fixed through screws 23 onto a plurality of boss portions 22 which protrude upwards from the bottom wall 4b. The boss portions 22 are unitary with the bottom wall 4a, so that the bottom wall 4a and the printed circuit board 20 are thermally connected through the boss portions 22.

The printed circuit board 20 has a first mount surface 20a which confronts the bottom wall 4a, and a second mount surface 20b which lies opposite to the first mount surface 20a. A socket 24 is mounted on the first mount surface 20a of the printed circuit board 20. The socket 24 supports a CPU 25 being a first circuit component. The CPU 25 has a base plate 26, and an IC chip 27 which is located centrally of the lower surface of the base plate 26. The IC chip 27 is very large in the quantity of heat generation during operation with the heightened processing speed and multifunctionalization thereof, and it needs to be cooled for maintaining a stable operation.

A plurality of second circuit components 28 which generate heat are respectively mounted on the first and second mount surfaces 20a, 20b of the printed circuit board 20. The second circuit components 28 include a plurality of tall circuit components 28a, for example, coils and capacitors. The circuit components 28a protrude from the printed circuit board 20 toward the bottom wall 4a and the bottom of the keyboard support portion 7, and their distal ends lie in touch with the bottom wall 4a and the bottom of the keyboard support portion 7. Therefore, the plurality of tall circuit components 28a are thermally connected to the first housing 4.

As shown in FIG. 2, among the second circuit components 28 located on the second mount surface 20b, those which are especially large in the quantity of heat generation are thermally connected to the bottom of the keyboard support portion 7 through a heat conduction member 29. The heat conduction member 29 is made of a material which has a thermal conductivity higher than that of the first housing 4, for example, a carbon sheet or a copper plate. The heat conduction member 29 is interposed between the second circuit components 28 and the bottom of the keyboard support portion 7 so as to conduct the heat of these second circuit components 28 to the top wall 4b of the first housing 4.

Figure 5:
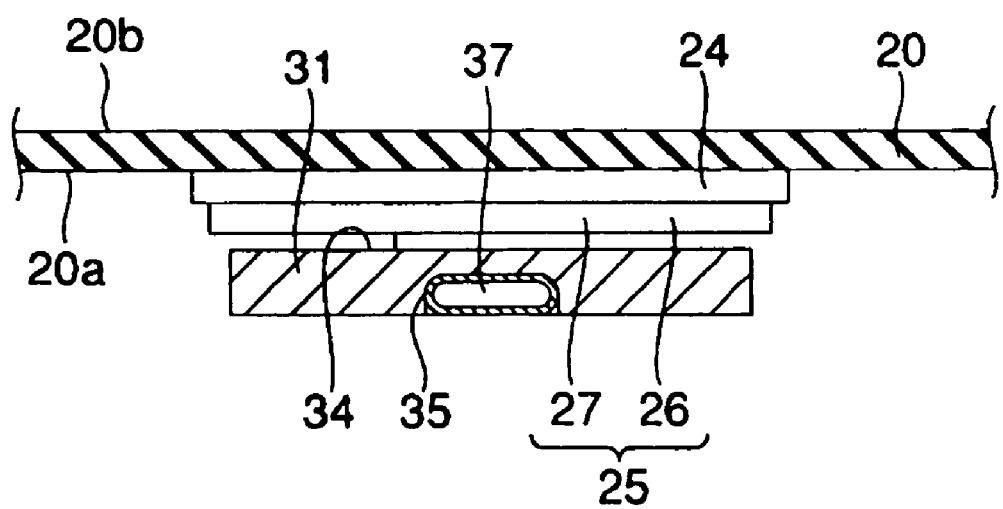
FIG. 5 is a sectional view showing the positional relationship among the CPU and a heat reception plate mounted on the printed circuit board, and the heat receiving end of a heat pipe, in the embodiment of the invention.

As shown in FIGS. 4 through 6, the first housing 4 accommodates a cooling unit of air cooling type 30 for cooling the CPU 25. The cooling unit 30 includes a heat reception plate 31, a heat pipe 32 being a heat transfer member, and a fan 33.

The heat reception plate 31 is made of a metal material of superior thermal conductivity, for example, an aluminum alloy or copper, and it has a square shape which is somewhat larger than the IC chip 27. This heat reception plate 31 has a flat heat reception surface 34, and a snug fit groove 35 which is located opposite to the heat reception surface 34. Here, the heat reception plate 31 is supported by the first mount surface 20a of the printed circuit board 20 through a leaf spring not shown. Thus, the heat reception surface 34 of the heat reception plate 31 is urged against the IC chip 27 of the CPU 25 and is thermally connected to this IC chip 27.

The heat pipe 32 extends over between the first chamber 16 and the second chamber 17, and it pass through the second portion 19b of the partition wall 15. This heat pipe 32 has a heat receiving end 37 which lies in the first chamber 16, and a heat radiation end 38 which lies in the second chamber 17. The heat receiving end 37 is snugly fitted in the snug fit groove 35 of the heat reception plate 31 so as to be thermally connected to this heat reception plate 31. The heat radiation end 38 is located immediately before the exhaust port 6.

A heat sink 39 is attached to the heat radiation end 38. The heat sink 39 has a plurality of radiation fins 40. The radiation fins 40 confront the exhaust port 6, and they are arranged in parallel with intervals between the adjacent ones thereof. The heat radiation end 38 of the heat pipe 32 pass through the central parts of the radiation fins 40, and it is thermally connected to the individual radiation fins 40.

Figure 7:
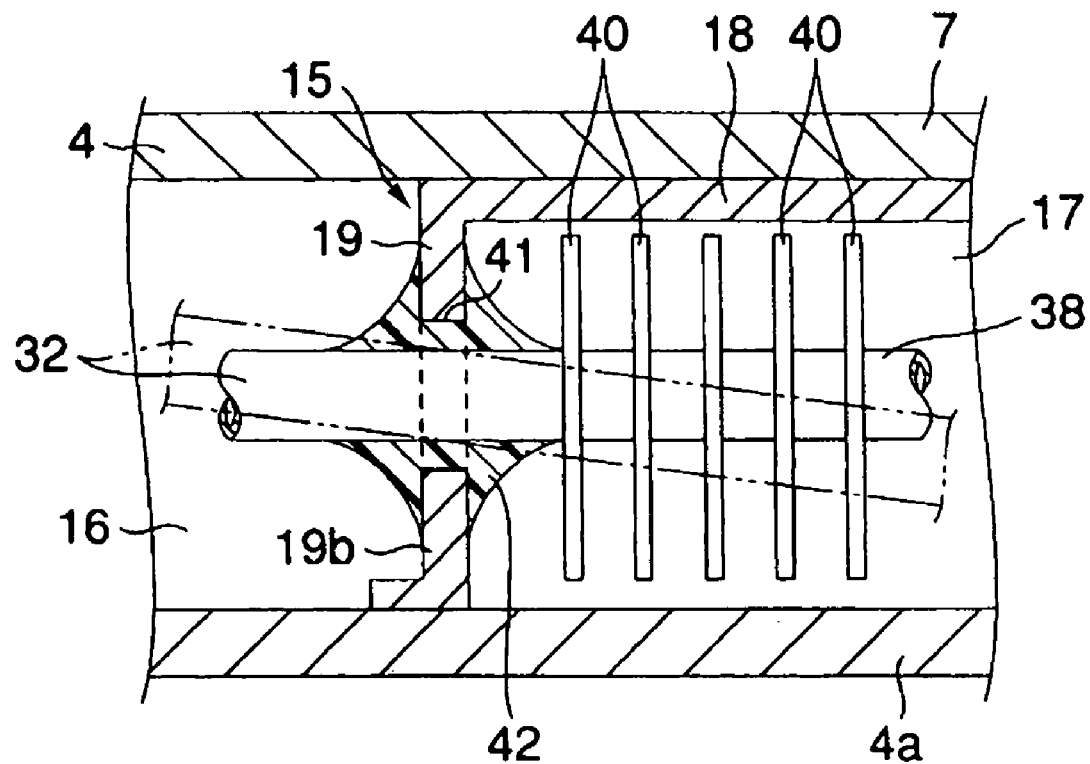
FIG. 7 is a sectional view showing a state where a part at which the heat pipe pass through a partition wall is liquid-tightly sealed through a sealing member, in the embodiment of the invention.

As shown in FIG. 7, the second portion 19b of the partition wall 15 is formed with a pass hole 41 which passes the heat pipe 32 therethrough. The pass hole 41 has a bore which is larger than the diameter of the heat pipe 32. A part where the heat pipe 32 pass through the partition wall 15, is liquid-tightly sealed by a sealing member 42. The sealing member 42 is constructed of a material of rich flexibility, for example, a synthetic resin or silicone, and it is provided inside the pass hole 41 so as to fill up the gap between the outer peripheral surface of the heat pipe 32 and the partition wall 15.

Therefore, notwithstanding that the heat pipe 32 pass through the partition wall 15, the first chamber 16 and the second chamber 17 are liquid-tightly divided. Further, since the sealing member 42 is flexible, it can absorb the motion of the heat pipe 32 even in a case, for example, where the CPU 25 on the printed circuit board 20 has inclined to move this heat pipe 32 as indicated by two-dot chain lines in FIG. 7.

As shown in FIGS. 4 and 6, the fan 33 includes a impeller 44, a motor 45 for rotating the impeller 44, and a casing 46 for accommodating the impeller 44 and the motor 45 therein. In this embodiment, the partition wall 15 serves also as the casing 46. Therefore, the fan 33 is accommodated in the second chamber 17.

The impeller 44 has a cylindrical boss portion 47, and a plurality of vanes 48 which protrude in tangential directions from the outer peripheral surface of the boss portion 47. This impeller 44 is interposed between the bottom wall 4a of the first housing 4 and the ceiling plate portion 18 of the partition wall 15, and is located coaxially with the suction ports 5.

The motor 45 is of inner rotor type, and it is accommodated inside the boss portion 47 coaxially therewith. This motor 45 has a cylindrical waterproof case 50. The waterproof case 50 accommodates a stator 51 and a rotor 52 therein. The stator 51 forms a cylindrical shape, and it is supported on a circuit plate 53. The rotor 52 is accommodated inside the stator 51 coaxially therewith.

The rotor 52 has a rotary shaft 54. The rotary shaft 54 rotates unitarily with the rotor 52, and it has a first end part 54a and a second end part 54b which are spaced in its axial direction. The first end part 54a of the rotary shaft 54 is rotatably supported in the bottom of the waterproof case 50 through a bearing 55. On the other hand, the second end part 54b of the rotary shaft 54 is rotatably supported in a support portion 56 provided at the upper end of the waterproof case 50, through a bearing 57.

The first end part 54a of the rotary shaft 54 protrudes below the waterproof case 50. This first end part 54a is coaxially fixed to the boss portion 47 of the impeller 44, and is adapted to rotate unitarily with this impeller 44.

The support portion 56 located at the upper end of the waterproof case 50 protrudes above the waterproof case 50. This support portion 56 is fixed into a snug fit hole 58 provided in the ceiling plate portion 18 of the partition wall 15, by such means as pressing-in or caulking. Therefore, the impeller 44 is supported by the ceiling plate portion 18 of the partition wall 15 in an attitude in which the rotary shaft 54 of the motor 45 is held vertical.

As shown in FIG. 6, a part where the rotary shaft 54 pass through the bottom of the waterproof case 50 is liquid-tightly sealed by a sealing member 60. The sealing member 60 is constructed of a material of rich flexibility, for example, a synthetic resin or silicone, and it fills up the gaps between the waterproof case 50 and the rotary shaft 54 and between the waterproof case 50 and the bearing 55.

Further, the support portion 56 of the waterproof case 50 pass through the ceiling plate portion 18. A part where the support portion 56 passes through the ceiling plate portion 18 is liquid-tightly sealed by a sealing member 61. The sealing member 61 is constructed of a material of rich flexibility, for example, a synthetic resin or silicone, and it fills up the gap between the support portion 56 and the snug fit hole 58, from outside the ceiling plate portion 18.

As shown in FIG. 6, the motor 45 has a plurality of cables 63 which are electrically connected to the circuit plate 53. The cables 63 are led out of the waterproof case 50 into the second chamber 17. These cables 63 pass through the waterproof case 50 through packings 64. Here, the cables 63 are collected into a bundle, and the bundle is led out into the first chamber 16 through a communicating hole 65 which is provided in the first portion 19a of the partition wall 15.

A connector 66 is connected to the distal ends of the cables 63 facing the first chamber 16. The connector 66 is electrically connected to the printed circuit board 20 which is accommodated in the first chamber 16. The communicating hole 65 through which the cables 63 pass, has a bore allowing the connector 66 to pass through this hole 65.

Figure 8:
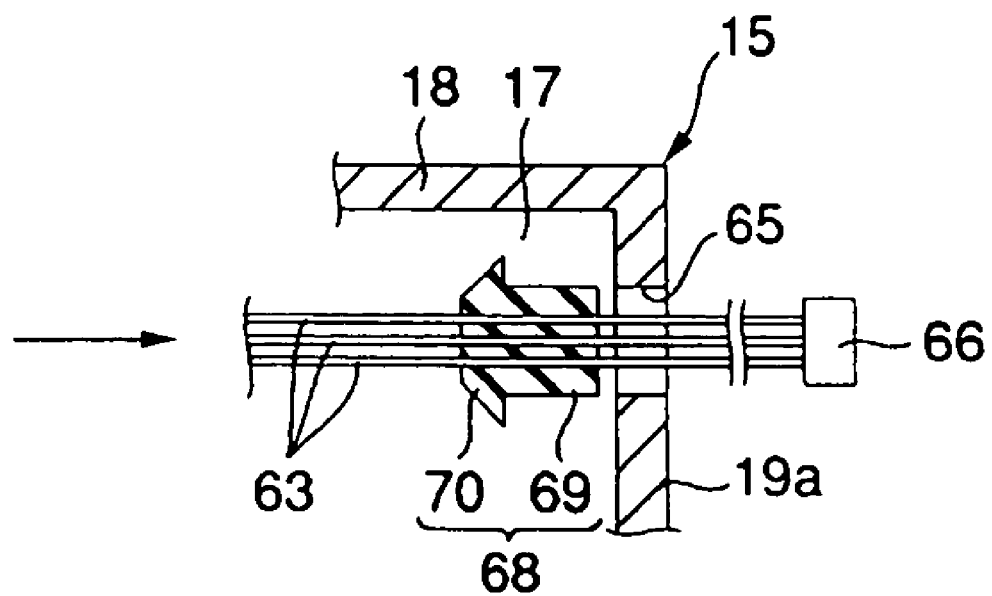
FIG. 8 is a sectional view showing the positional relationship between a sealing member unitary with cables and a communicating hole provided in the partition wall, in the embodiment of the invention.
Figure 9:
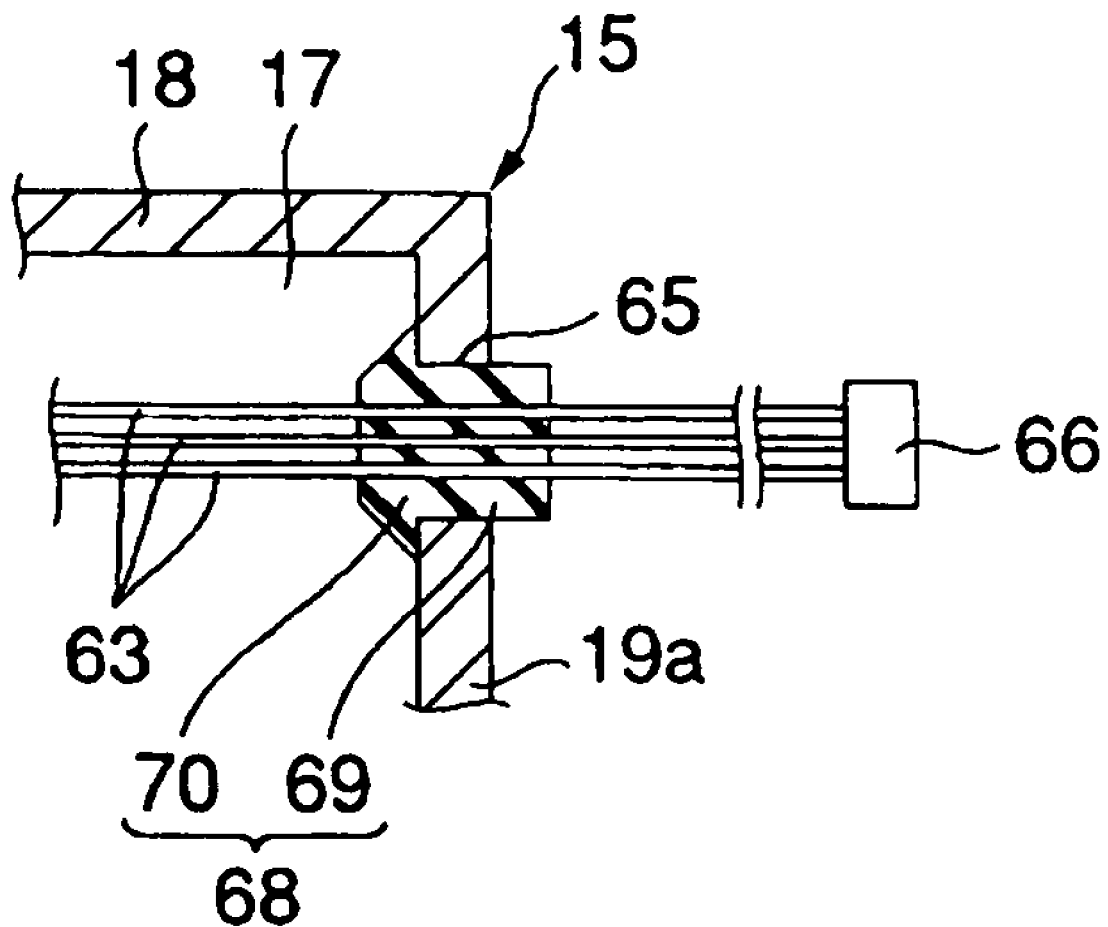
FIG. 9 is a sectional view showing a state where a part at which the cables pass through the partition wall is liquid-tightly sealed through a sealing member, in the embodiment of the invention.
Figure 10:
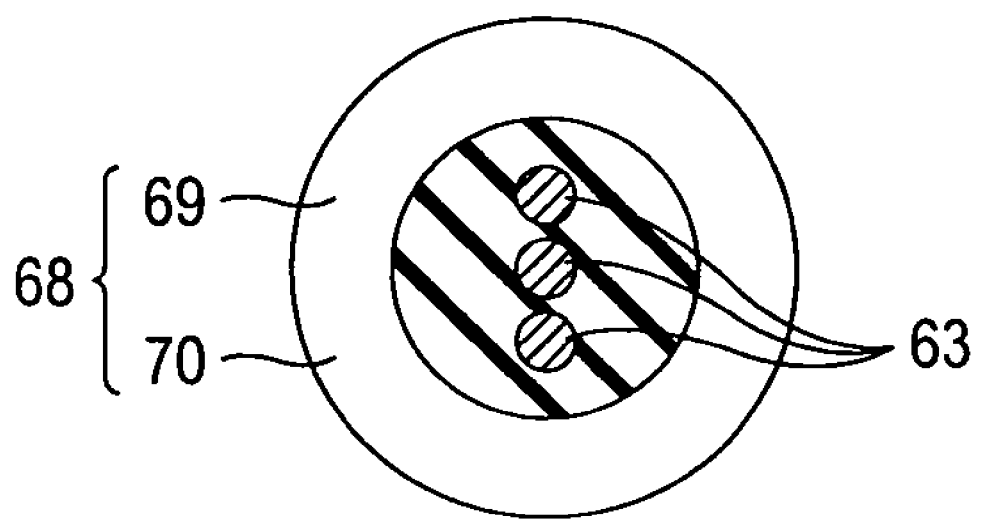
FIG. 10 is a sectional view of the sealing member attached to the cables, in the embodiment of the invention.

As shown in FIGS. 8 through 10, a sealing member 68 is attached midway of the cables 63. The sealing member 68 is constructed of a flexible material, for example, a rubbery elastic member. This sealing member 68 has a columnar main portion 69 which is fitted in the communicating hole 65, and a flange portion 70 which is formed at one end of the main portion 69. The main portion 69 and the flange portion 70 mold the cables 63 unitarily.

The sealing member 68 is fitted into the communicating hole 65 from the side of the second chamber 17. Thus, the main portion 69 liquid-tightly fills up the gap between the cables 63 and the first portion 19a of the partition wall 15. Simultaneously, the flange portion 70 abuts on the first portion 19a of the partition wall 15 so as to prevent the sealing member 68 from coming off the communicating hole 65.

When the portable computer 1 is used, the IC chip 27 of the CPU 25 generates heat. The heat of the IC chip 27 is conducted to the heat receiving end 37 of the heat pipe 32 through the heat reception plate 31. Owing to the heat conduction, a working fluid enclosed in the heat receiving end 37 is heated and vaporized. The vapor flows from the heat receiving end 37 toward the heat radiation end 38, and it is condensed in this heat radiation end 38. Heat radiated by the condensation is diffused by thermal conduction to the heat sink 39, and is radiated from the surfaces of the radiation fins 40.

The working fluid liquidized in the heat radiation end 38 is returned to the heat receiving end 37 by a capillary force, and it receives the heat of the IC chip 27 again. Owing to the repetition of the vaporization and condensation of the working fluid, the heat of the IC chip 27 is transferred to the heat sink 39 which is accommodated in the second chamber 17.

The impeller 44 of the fan 33 rotates under the torque of the motor 45 when the temperature of the IC chip 27 has reached a predetermined value. Owing to the rotation of the impeller 44, cool air outside the computer body 2 is imbibed from the suction ports 5 into the second chamber 17. The imbibed air is vomited from the outer periphery of the impeller 44 toward the heat sink 39, and is passed through the interspaces between the adjacent radiation fins 40.

As a result, the heat of the IC chip 27 conducted to the radiation fins 40 is carried away afloat in the currents of the air. The air heated by heat exchange with the heat sink 39 is exhausted out of the computer body 2 through the exhaust port 6.

Not only the CPU 25, but also the second circuit components 28 generate heat during the operation of the portable computer 1. The heat of the second circuit components 28 is diffused to the first housing 4 directly or via the heat conduction member 29. Further, part of the heat of the second circuit components 28 is conducted to the printed circuit board 20, and it is diffused therefrom to the first housing 4 through the boss portion 22.

The heat of the second circuit components 28 diffused to the first housing 4 is conducted to the partition wall 15. Since the partition wall 15 is cooled by the air vomited from the impeller 44, the heat of the second circuit components 28 is radiated out of the first housing 4 by heat exchange with the air.

According to the embodiment of the invention, the heat pipe 32 for transferring the heat of the CPU 25 to the heat sink 39 has its heat radiation end 38 guided into the second chamber 17 and directly connected to the heat sink 39. Therefore, the thermal resistance of a heat conduction path which extends from the heat radiation end 38 of the heat pipe 32 to the heat sink 39 can be suppressed low, so that the heat of the CPU 25 can be efficiently conducted to the heat sink 39.

As a result, notwithstanding that the first chamber 16 for accommodating the CPU 25 therein is the hermetically-sealed space whose communication with the exterior of the first housing 4 is cut off, the heat radiation performance of the CPU 25 can be maintained favorable. Therefore, the overheat of the CPU 25 can be prevented, and the operating environmental temperature of the CPU 25 can be held appropriate.

In addition, according to the above construction, the place where the heat pipe 32 pass through the partition wall 15 and the place where the cables 63 pass through the partition wall 15 are liquid-tightly sealed by the sealing members 42 and 68, respectively. Therefore, notwithstanding that the heat pipe 32 and the cables 63 extend over between the first chamber 16 and the second chamber 17, foreign matters such as moisture and dust can be prevented from intruding from the second chamber 17 into the first chamber 16.

More specifically, the suction ports 5 for imbibing the cooling air, and the exhaust port 6 for discharging the air are open to the second chamber 17 of the first housing 4. Therefore, when the portable computer 1 is used in a bad environment, for example, an outdoor site of construction or a moist place, water can intrude into the second chamber 17 through the suction port 5 or the exhaust port 6. When the water has been led from the second chamber 17 into the first chamber 16 to adhere to, for example, the printed circuit board 20, this printed circuit board 20 might be short-circuited.

In this regard, according to the embodiment, the parts where the heat pipe 32 and the cables 63 extend over between the first chamber 16 and the second chamber 17 are liquid-tightly sealed by the sealing members 42 and 68, respectively. Therefore, even when the water has intruded into the second chamber 17, it stays in the second chamber 17 and does not flow into the first chamber 16.

Further, regarding the fan 33 located in the second chamber 17, the motor 45 has waterproof specifications, and the bearing portions of the rotary shaft 54 are liquid-tightly sealed through the sealing members 60 and 61. Therefore, even if the water has adhered to the motor 45, it can be prevented from intruding into the waterproof case 50 which accommodates the stator 51, the rotor 52 and the circuit plate 53 therein.

Accordingly, the embodiment brings forth the advantages that the waterproofness and dropproofness of the portable computer 1 as well as the fan 33 are enhanced, and that the malfunctions of the portable computer 1 attributed to the invasion of water can be prevented with the heat radiation performance of the CPU 25 maintained.

The invention is not specified to the embodiment, but it can be variously altered and performed within a scope not departing from the purport thereof.

By way of example, in the embodiment, the heat of the CPU has been transferred to the heat sink by employing the heat pipe. However, the invention is not restricted to this aspect, but the heat of the CPU may well be transferred to the heat sink by employing a liquid coolant which is circulated between the CPU and the heat sink.

Further, the circuit component which generates heat is not restricted to the CPU, but it may well be, for example, a chip set.

Besides, the electronic apparatus according to the embodiments of the invention is not restricted to the portable computer, but the above-embodiments of the invention can be similarly performed for other information equipments, for example, a PDA (Personal Digital Assistant).

What is claimed is:

1. An electronic apparatus comprising:
   a housing having a suction port and an exhaust port;
   a partition wall partitioning an interior of the housing with a first chamber and a second chamber, the first chamber accommodating therein a circuit component which generates heat, the suction port and the exhaust port being open to the second chamber;
   a heat transfer member passing through the partition wall to transfer a heat of the circuit component from the first chamber to the second chamber;
   a fan disposed in the second chamber, and the fan discharging from the exhaust port out of the housing air suctioned through the suction port so as to emit the heat of the circuit component transferred to the second chamber; and
   a sealing member sealing a part at which the heat transfer member pass through the partition wall,
   wherein the fan has a impeller, a motor that rotates the impeller, and a casing that accommodates the impeller and the motor therein,
   wherein the casing serves as the partition wall, and
   wherein the motor further includes:
      a waterproof case that accommodates a stator;
      a rotor;
      a rotary shaft being rotatably supported through a bearing by the waterproof case, and the rotary shaft protruding outside the waterproof case, and the rotary shaft being connected to the impeller; and
      a sealing member liquid-tightly sealing a part where the rotary shaft passes through the waterproof case.

2. An electronic apparatus according to claim 1, wherein the heat transfer member is a heat pipe, wherein the heat pipe includes;
   a heat receiving end thermally connected to the circuit component; and
   a heat radiation end being led to the second chamber, and the heat radiation end thermally connecting to a heat sink, and
   wherein the heat sink is located between the exhaust port of the housing and the fan.

3. An electronic apparatus according to claim 1, wherein the partition wall has a hole which the heat transfer member passes,
   wherein the sealing member fills up a gap between the hole and the heat transfer member, and
   wherein the sealing member has flexibility allowing a displacement of the heat transfer member.

4. An electronic apparatus according to claim 1, wherein the motor has a cable led out into the second chamber,
   wherein the cable passes through the partition wall to be guided into the first chamber, and
   wherein a part at which the cable passes though the partition wall is liquid-tightly sealed through a sealing member.

5. An electronic apparatus according to claim 1, wherein the waterproof case has a support portion which pass through the partition wall, and
   wherein a part at which the support portion passes through the partition wall is liquid-tightly sealed through a sealing member.

6. An electronic apparatus according to claim 1, wherein the first chamber of the housing accommodates a printed circuit board therein, and
   wherein the circuit component is mounted on the printed circuit board.

7. An electronic apparatus comprising:
   a metallic housing having a suction port and an exhaust port;
   a metallic partition wall liquid-tightly partitioning an interior of the housing with a first chamber and a second chamber, the first chamber accommodating therein first and second circuit components which generate heat, the suction port and the exhaust port being open to the second chamber;
   a heat transfer member being disposed pass through the partition wall to transfer a heat of the first circuit component from the first chamber to the second chamber;
   a heat conduction member conducting a heat of the second circuit component to the housing;

a fan being disposed in the second chamber and discharging from the exhaust port out of the housing air suctioned through the suction port so as to emit the heat of the first circuit component transferred to the second chamber; and a sealing member liquid-tightly sealing a part at which the heat transfer member passes through the partition wall, wherein the first and second circuit components are mounted on a printed circuit board, and the printed circuit board is thermally connected to the housing.

8. An electronic apparatus according to claim 7, wherein the partition wall is thermally connected to the housing.

* * * * *